Feb. 7, 1961    L. A. BARERA ET AL    2,970,933
COMPOSITE BEARINGS AND PROCESS OF MAKING THE SAME
Filed Jan. 18, 1957    2 Sheets-Sheet 1
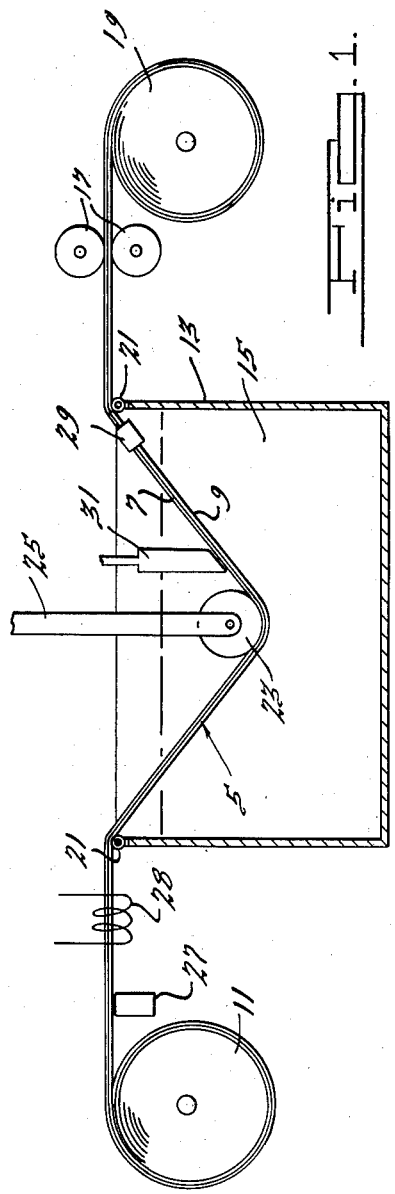
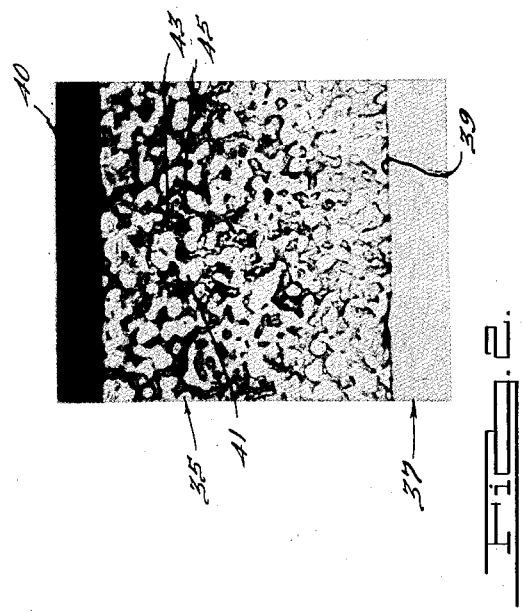
INVENTORS.
Lawrence A. Barera.
William G. Friedrich, Jr.
Gordon J. LeBrasse.
BY
Harness, Dickey & Pierce
ATTORNEYS.

INVENTORS.
Lawrence A. Barera
William G. Fiedrich, Jr.
Gordon J. LeBrasse.
BY Harness, Dickey & Pierce,
ATTORNEYS.

United States Patent Office 2,970,933
Patented Feb. 7, 1961

2,970,933

COMPOSITE BEARINGS AND PROCESS OF MAKING THE SAME

Lawrence A. Barera, Ann Arbor, William G. Fiedrich, Jr., South Lyon, and Gordon J. Le Brasse, Ann Arbor, Mich., assignors to Federal-Mogul-Bower Bearings, Inc., Detroit, Mich., a corporation of Michigan Filed Jan. 18, 1957, Ser. No. 634,880

8 Claims. (Cl. 117—71)

This invention relates to improvements in composite bearing structures of the type having a dense sintered copper-lead bearing layer bonded to a hard metal backing strip.

It is well known that in bearings of the character indicated the copper-lead bearing layer is susceptible to corrosion in service and resort has been had to various expedients to protect the bearing layer from corrosion, one of which is to provide the copper-lead layer with a corrosion resistant overlay of lead-tin alloy usually electroplated to the bearing layer. Bearings have also been manufactured by filling the voids of a porous copper matrix with a low melting bearing metal, the copper matrix having been preliminarily treated in an attempt to control the size and distribution of the voids and to level the top surface thereof. Expedients such as the above that have heretofore been proposed add to the cost of the bearing not insignificantly and have disadvantages peculiar to each which shall be briefly touched upon without elaboration to point up the problem solved by the instant invention. For example, in the case of bearings with an overlay they are obviously expensive and a chief drawback connected therewith is their inability to be used for undersize bearings which must be machined in the field for replacement purposes. In the case of the porous copper matrix there is the problem of preventing alteration of its sponge-like character and it is difficult to control uniformity of size and distribution of its voids which are subsequently filled with the soft bearing metal and which voids determine the grain size and distribution of the latter. Generally the bearing metal filler for the sponge matrix conglomerates and becomes quite massive and therefore susceptible to fatigue in heavy duty operations.

Accordingly, important objects of the present invention are to provide a process of treating composite bearing structures in which a dense sintered layer of copper-lead bearing material is bonded to a hard metal backing strip to render the same corrosion resistant wherein portions of the original lead phase of the copper-lead layer are displaced by a metal of the group tin and tin-antimony and the remaining portions are penetrated by the said metal and form an alloy therewith; to provide a process of impregnating a composite bearing structure of the character indicated to penetrate tin into the copper-lead bearing layer thereof which is relatively simple and yet efficient and reliable and which is characterized by the absence of affectation throughout the process of the uniformity and fineness of the original lead phase of the copper-lead layer; and to provide a process of the type specified which includes steps to enhance the effectiveness and uniformity of tin penetration.

Other important objects of the invention are to provide an improved composite bearing which is a product of impregnating a hard metal backed dense sintered layer of copper-lead bearing material so that portions of the original lead phase of the said layer are displaced by a metal of the group tin and tin-antimony and the remaining portions are penetrated by the said metal and form an alloy therewith; to provide a composite bearing of the type specified which has a simply controlled fine grain size and uniform distribution of a lead-tin alloy phase; and to provide an improved composite bearing of the character indicated which is economical of manufacture, corrosion resistant and which has improved strength and resistance to fatigue.

The above and related objects will become apparent during the course of the following description taken in conjunction with the accompanying drawings.

In the drawings:

Figure 1 is a diagrammatic view illustrating steps in one form of the process embodying the invention;

Figure 2 is a photomicrograph of a cross section of one form of bearing embodying the invention;

Figure 3:
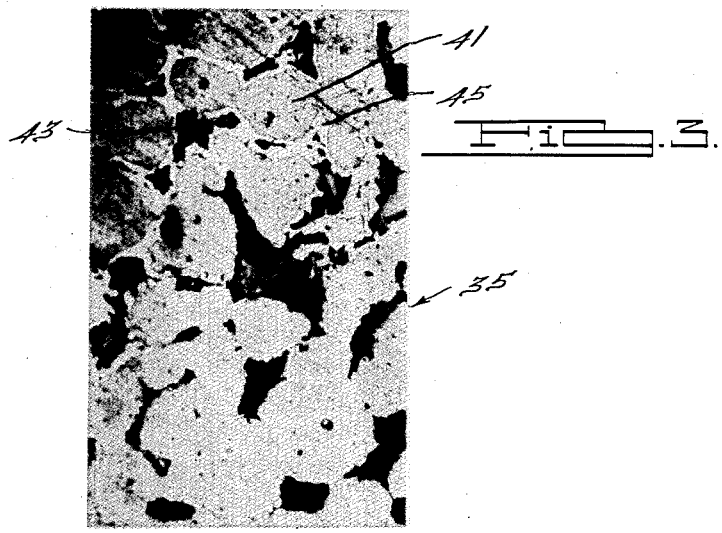
Figure 3 is a photomicrograph at greater magnification of a portion of the structure of Figure 2.

In accordance with the present invention it has now been found that a bearing structure having a dense sintered copper-lead layer bonded to a hard metal backing strip may be neatly and very effectively penetrated with tin by treatment in a molten lead solder bath as will be described and when so treated yields a composite bearing which is not only more resistant to corrosion but which has greater strength and resistance to fatigue and a uniform distribution and fine grain size of a tin in lead phase. The copper-lead layer becomes selectively penetrated such that portions of the original lead phase thereof are displaced by tin and the remaining portions are penetrated by tin and form a lead-in alloy therewith and a tin-rich phase is formed in the boundaries between the grains of copper and lead-tin alloy.

The bearing structure starting material of the present invention comprises a hard metal backing strip preferably steel and a dense sintered copper-lead bearing layer formed from powder and bonded to the hard metal backing strip. The copper-lead bearing structure may be one made utilizing techniques set forth in U.S. Patent 2,260,247 to Darby et al. and with high purity prealloyed powder produced in accordance with the later U.S. Patent 2,460,991 to Le Brasse et al. both of which are assigned to the present assignee. The bearing layer of the bearing structure starting material is termed herein a copper-lead bearing layer and the term as used throughout the specification and in the appended claims includes straight copper-lead as well as bronze-lead bearing layers and various other alloying elements may be included in the copper phase in more or less minor amounts as for instance nickel, tin or phosphorous in the case of the straight copper-lead bearing layer and nickel, zinc or phosphorous in the case of the bronze-lead bearing layer. In any case the copper-lead bearing layer is non porous and dense having been compacted and compressed against the hard metal backing strip following the sintering step in its manufacture and the copper and lead are not alloyed in the true sense but are present in separate phases in more or less elemental form.

The process of the present invention comprises immersing a copper-lead bearing structure as above described in a bath of molten lead solder so that portions of the original lead phase of the bearing layer are replaced by tin and the remaining portions are penetrated by tin and form a lead-tin alloy therewith. In the embodiment of the process illustrated in Figure 1 a copper-lead bearing structure in the form of a composite strip indicated generally at 5 and comprising an elongated steel backing strip 7 and a dense sintered copper-lead bearing layer 9 firmly bonded to the strip 7 and wound upon a feed roll 11 is continually drawn through a tank 13 containing a molten lead solder bath 15 by a pair of opposing pull rollers 17 and wound upon a take-up roll 19. Stressing the strip as by tension applied by the rollers 17 beneficially affects the tin penetration. In the instance shown the composite strip 5 passes over a pair of rollers 21 which may be rotatably secured in opposite sides of the tank 13 and beneath a central roller 23 submerged in the bath 15 and carried on the end of a vertical shaft 25. Suitable flux such as liquid zinc chloride may be applied if desired to the strip 5 as by the applicator 27 and preferably the strip is preliminarily heated before it enters the bath 15 to facilitate wetting thereof and to minimize temperature variations in the bath. An induction heater 28 through which the strip 5 passes may be provided for this purpose. As the strip emerges from the bath 15 it is wiped clean on both surfaces by a wiper mechanism 29 of well known construction.

A transducer 31 operating in the example shown against the continuously moving strip 5 is preferably employed to effect relative vibration of the bath 15 and the strip 5 at either a sonic or supersonic frequency. The step of relatively vibrating the bath 15 and the strip 5 at a frequency in the range of sonic and supersonic frequencies produces unexpectedly superior control and more effective and uniform penetration of tin into the copper-lead bearing layer 9 as will appear more fully hereinafter and is a feature of the process of the invention. Vibration of either the strip 5 or the bath 15 or both may be accomplished in any of the known or conventional ways such as by electro-magnetic means or magnetostrictive means or even by mechanical means provided it is adapted for sufficient high speed operation such that the bath 15 and the strip 5 can be relatively vibrated at a frequency in the range of sonic and supersonic frequencies. Mechanical air vibrators for example operating either singly or in tandem have been found to be satisfactory.

The lead solder bath consists essentially of lead and tin to which may be added antimony and when the latter is present it penetrates the copper-lead bearing layer along with tin. The relative proportions of lead-tin or lead-tin-antimony may vary considerably and as the concentration of the tin or tin and antimony is increased with other factors constant the final composite bearings will be selectively penetrated with greater amounts of tin or tin and antimony. It has been found that for satisfactory lead displacement and simultaneous tin or tin and antimony penetration the temperature of the molten lead solder bath should be so maintained as to produce a liquid lead phase in the copper-lead bearing structure starting material. The temperature of the bath should be at least as great as the melting point of lead and temperatures in the range of 650° F. to 685° F. are usual while temperatures above 750° F. appear to be too high.

The final composite bearing should contain sufficient lead in its bearing layer to give adequate bearing properties, sufficient tin to give adequate corrosion resistance with the balance being copper. For applications where the composite bearing is to be used on soft shafts greater amounts of lead should be present and for use on hard shafts lesser amounts of lead can be tolerated. In general the lead content of the bearing layer in the final composite bearing can vary between 20% and 60%; all percentages and parts hereinafter given being by weight. The amount of tin which penetrates the bearing layer and which is contained therein in the final composite bearing can be controlled by varying the temperature and composition of the molten lead solder bath, the time of immersion, the duration and rate of vibration and other factors. The effective depth of penetration of the tin can be to the interface of the hard metal backing strip or less and the tin content of the bearing layer in the final composite bearing is proportioned with respect to the lead content so that the tin which has penetrated into the lead phase and forms a lead-tin alloy is present in an amount at least equal to 1 part of tin to 24 parts of lead and preferably in an amount equal to about 1 part of tin to 8 parts of lead. When the amount of tin which has penetrated into the lead phase closely approaches an amount equal to about 1 part of tin to 4 parts of lead an undesirable amount of low melting eutectic forms in lieu of a higher melting lead-tin alloy. As the tin penetrates the copper-lead bearing structure starting material a certain amount in addition to that amount which actually enters the lead phase wets the copper phase and forms a tin-rich phase in the boundaries between the grains of copper and the lead-tin alloy. For each amount of tin which penetrates the lead phase a corresponding amount forms the tin-rich phase so that the total amount of tin in the bearing layer of the final composite bearing is greater than and is thus fixed by the amounts above set forth of tin which are desired in the lead phase. In practice however, it is easier to indirectly determine the amount of tin which has penetrated the lead phase by determining the total amount of tin present in the bearing layer and the penetration of tin into the lead phase can be controlled simply in this way. In general the total amount of tin in the bearing layer of the final composite bearing can vary from as little as 2% to as much as 24% with considerations of economy and the particular application dictating as to the greater amount of tin. Preferably the total amount of tin in the bearing layer of the final composite bearing is maintained between 4% and 10%.

The following examples will serve to illustrate the method and product of the invention in greater detail.

EXAMPLE I

A bearing structure in strip form consisting of a 0.017 inch nominal thickness dense sintered copper-lead bearing layer bonded to a 0.10 inch nominal thickness steel backing strip was drawn through a molten solder bath of about 75% lead and 25% tin maintained at approximately 675° F. The sintered copper-lead bearing layer had an approximate analysis of 70% copper and 30% lead. The composite strip was processed continuously through the bath and prior to entering the same 50° Baumé zinc chloride flux was applied to the copper-lead bearing layer and thereafter in its movement just as it entered the bath the composite strip was preliminarily heated.

The following are average analyses at the depths indicated of a composite strip processed as above which had an immersion time in the bath of approximately 60 seconds duration. The surface film of adherent solder was first removed with pumice.

*Table 1*

|  | Percent Tin | Percent Copper | Percent Lead |
|---|---|---|---|
| Surface | 10.70 | 70.90 | 18.30 |
| 0.005" stock removed | 7.31 | 68.20 | 24.40 |
| 0.010" stock removed | 1.26 | 69.80 | 28.90 |
| 0.015" stock removed | 0.09 | 69.20 | 30.60 |

Figure 2 is a photomicrograph at 150 diameters magnification of an etched cross section of the composite strip processed in the above example. Figure 3 is a photomicrograph at 500 diameters magnification of a portion of the structure of Figure 2 and shows more clearly the character of tin penetration into the copper lead bearing layer. The bearing layer is indicated generally at 35, the steel backing strip at 37 and the interface between the bearing layer 35 and the backing strip at 39. The top surface of the bearing layer 35 is indicated at 40 and as can be seen is quite smooth and flat. The predominant light-colored appearing constituent is the copper phase which is indicated at 41 and the dark-appearing grains distributed throughout the copper phase is the lead-tin alloy phase 43. The white-appearing constituent in the boundaries between the lead and copper grains is the tin-rich phase designated 45. The average depth of effective tin penetration was found to be approximately .010 inch which was about 60% of the thickness of the bearing layer from the top surface 40 to the interface 39. It was also determined that the lead grains to the effective depth of penetration contained appreciable amounts of tin as lead-tin alloy. It can be noted that the bearing layer 35 both before and after impregnation is non porous and dense, the portion of the bearing layer between the interface 39 and the effective depth of tin penetration being substantially the same as before the impregnation treatment.

EXAMPLE II

A composite strip identical to the above was similarly processed except that during the immersion step the bath was subjected to supersonic vibrations sufficient to vibrate the same relative to the strip at a frequency of approximately 20,000 cycles per second. For the same immersion time in the bath as in Example I above the strip processed in this example had the following average analysis at the depths indicated.

*Table 2*

|  | Percent Tin | Percent Copper | Percent Lead |
| --- | --- | --- | --- |
| 0.005" stock removed | 13.05 | 68.90 | 18.00 |
| 0.010" stock removed | 11.40 | 69.60 | 18.80 |
| 0.015" stock removed | 11.30 | 69.80 | 18.90 |

Figure 4:
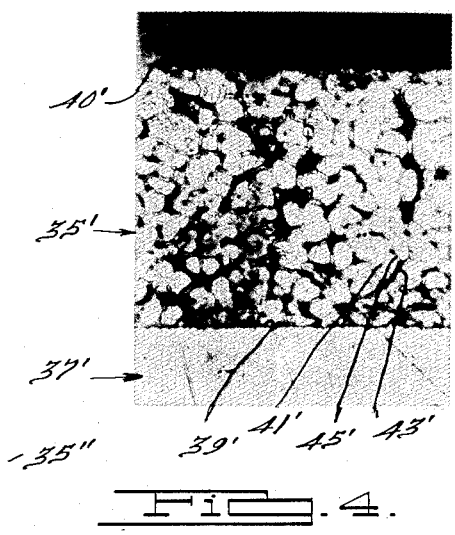
Figure 4 is a photomicrograph of another form of bearing embodying the invention.

Figure 4 is a photomicrograph at 150 diameters magnification of an etched cross section of the composite strip processed in this example. Similar structure is designated by like numerals prime. The average depth of effective tin penetration was determined to be to the interface 39' between the bearing layer 35' and the backing strip 37'. It was determined that the tin was more uniformly distributed throughout the bearing layer and that which penetrated the lead phase formed a lead-tin alloy therewith.

EXAMPLE III

An identical composite strip was similarly processed as in Example II using supersonic vibrations of approximately 20,000 cycles per second which were applied to the strip while it was immersed in a lead solder bath maintained at the same temperature as in the above examples but of different composition. The composition of the solder bath was altered however for this example and consisted of 90% lead and 10% tin. The following is the average analysis at the depths indicated of the composite strip which had the same immersion time in the bath as above.

*Table 3*

|  | Percent Tin | Percent Copper | Percent Lead |
| --- | --- | --- | --- |
| 0.005" stock removed | 6.68 | 67.60 | 25.65 |
| 0.010" stock removed | 6.38 | 67.80 | 25.75 |
| 0.015" stock removed | 5.76 | 68.10 | 26.10 |

The following is an example of the production of a bearing which has its bearing layer penetrated with tin-antimony.

EXAMPLE IV

A composite strip identical to that used in Example III was similarly processed using supersonic frequencies of approximately 20,000 cycles per second applied to the strip while it was immersed in a lead solder bath maintained at the same temperature as above but of different composition. The composition of the lead solder bath was altered for this example and consisted of approximately 10% tin, 4% antimony and balance lead. The following is the average analysis at the depths indicated of the bearing layer. The composite strip had the same immersion time in the bath as in Example I.

*Table 4*

|  | Percent of Tin | Percent of Antimony | Percent of Copper | Percent of Lead |
| --- | --- | --- | --- | --- |
| .005" stock removed | 8.0 | 1.93 | 69.72 | 20.20 |
| .010" stock removed | 7.8 | 1.79 | 70.30 | 20.00 |

EXAMPLE V

A composite strip comprising a 0.020" nominal thickness dense sintered copper-lead bearing layer bonded to a 0.101" steel backing strip was processed continuously through a solder bath of approximately 70% lead and 30% tin maintained at about 680° F. The bearing layer had an analysis of approximately 65% copper and 35% lead. The composite strip was moved through the bath at a rate of 10½ feet per minute while passing under a tandem arrangement of five air vibrators which vibrated it relative to the bath at a sonic frequency of about 900 cycles per minute. The effective tin penetration extended to the steel back and that which penetrated the remaining lead phase formed a lead-tin alloy. The lining surface was free of pitting and the steel back was quite clean.

The following is the average chemical analysis of the bearing layer at the depths indicated.

*Table 5*

|  | Percent Tin | Percent Copper | Percent Lead |
| --- | --- | --- | --- |
| 0.005" stock removed | 6.22 | 67.60 | 25.90 |
| 0.010" stock removed | 6.22 | 67.76 | 25.90 |
| 0.015" stock removed | 4.94 | 68.10 | 26.10 |

EXAMPLE VI

A composite strip similar to that above except that the thickness of the bearing liner was 0.016" nominal and the steel back 0.067" nominal was similarly processed through the same solder bath and vibrated at the same sonic frequency except that the speed of travel for the composite strip was increased to 15 feet per minute. The same general appearance for the processed composite strip was noted and the average depth of effective tin penetration extended to the steel back. The following is the chemical analysis conducted on the bearing layer.

*Table 6*

|  | Percent Tin | Percent Copper | Percent Lead |
| --- | --- | --- | --- |
| 0.005" stock removed | 6.73 | 68.80 | 24.40 |
| 0.010" stock removed | 4.52 | 69.00 | 26.40 |

EXAMPLE VII

Figure 5:
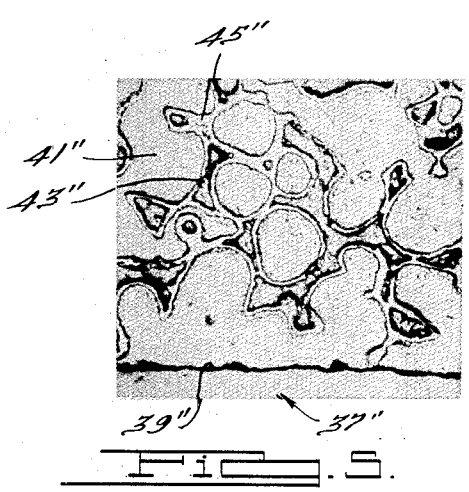
Figure 5 is a photomicrograph at greater magnification of a form of bearing similar to that shown in Figure 4.

A composite bearing was prepared substantially as described in Example VI using sonic vibrations of the same frequency and with the exception that the bearing layer thickness was 0.017" nomical and the solder bath was 80% lead and 20% tin maintained at about 650° F. Semi-cylindrical sleeve bearings were made up from the composite bearing thus prepared and employed as connecting rod bearings on a 1956 V-8 Ford engine which was run at 4800/p.s.i. loading through a 110:32 hour test prematurely terminated because of a broken No. 4 connecting rod which severely mutilated the No. 4 bearing. The other connecting rods showed little effect from wear and the bearings were generally in excellent condition. Figure 5 is a photomicrograph at 500 diameters magnification of an etched cross-section of one of these. The tin penetration was to the full depth of the bearing layer 35" and the tin which penetrated the remaining lead phase formed a lead-tin alloy phase 43". The average over-all composition of the bearing layer is given by the following chemical analysis: tin 8.7%, copper 67.4% and lead 23.9%.

The following example is illustrative of the production of bearings of high lead content which have been found to result in even lower shaft wear.

EXAMPLE VIII

A composite bearing was prepared by sintering and bonding pre-alloyed powder having a composition of approximately 50% copper and 50% lead to a steel back. The analysis of the dense sintered copper-lead bearing layer was found to be 50.60% copper and 49.30% lead. The composite strip prepared as described was processed continusuoly through lead solder baths the composition of which was approximately 4% tin and balance lead. The strip was vibrated while being processed through the bath at a supersonic frequency of approximately 20,000 cycles per second and had an immersion time of approximately 30 seconds. The temperature of the bath was maintained at approximately 675° F. The following is the average chemical analysis of the bearing layer at the depths indicated.

Table 7

| | Percent Tin | Percent Copper | Percent Lead |
|---|---|---|---|
| 0.010" stock removed | 5.10 | 54.40 | 40.40 |
| 0.015" stock removed | 4.55 | 54.40 | 41.00 |

It will thus be seen that there has been provided by the present invention a composite bearing and process of manufacturing the same in which the objects hereinabove set forth together with many thoroughly practical advantages are successfully achieved. It will be apparent that the invention is susceptible to variation, modification and change without departing from the spirit thereof or from the scope of the appended claims.

What is claimed is:

1. A process of manufacturing a composite bearing comprising treating a metallic bearing structure comprising a bearing layer bonded to a hard metal backing strip, said bearing layer being a dense and non porous sintered layer of interspersed phases of copper and lead bonded to said strip, said treatment comprising diffusing into said bearing structure a molten tin-containing alloy so that portions of the original lead phase of said sintered layer have been displaced by tin and the remaining portions have been penetrated by and are alloyed with the said tin.

2. A process for manufacturing a composite bearing comprising treating a bi-metal bearing structure comprising a bearing layer bonded to a hard metal backing strip, said bearing layer being a dense and non porous sintered layer of interspersed phases of copper and lead bonded to said strip, said treatment comprising immersing said bearing structure in a molten lead-tin bath until portions of the original lead phase of said sintered layer have been displaced by tin and the remaining portions have been penetrated by and are alloyed with the said tin, and maintaining said bath during the immersion step at a temperature sufficient to produce a liquid lead phase in the copper-lead layer of the bearing structure starting material.

3. A process of manufacturing a composite bearing comprising treating a bi-metal bearing structure comprising a bearing layer bonded to a hard metal strip, said bearing layer being a dense and non porous sintered layer of interspersed phases of copper and lead bonded to said strip, said treatment comprising immersing said bearing structure in a molten bath of lead-tin until portions of the original lead phase of said sintered layer have been displaced by tin and the remaining portions have been penetrated by and are alloyed with the said tin, and relatively vibrating said bath and said bearing structure at a frequency in the range of sonic and supersonic frequencies.

4. A process of manufacturing a composite bearing comprising contacting a dense and nonporous sintered layer of interspersed phases of copper and lead bonded to a backing strip with a molten metal selected from the group consisting of lead-tin alloy and lead-tin-antimony alloy for a period of time sufficient to cause said metal to diffuse into said interspersed lead phases in said layer displacing portions thereof and becoming alloyed therewith.

5. A process of manufacturing a composite bearing comprising treating a metallic bearing structure comprising a bearing layer bonded to a hard metal backing strip, said bearing layer being a dense and nonporous sintered layer comprising interspersed phases of copper and lead bonded to said backing strip, said treatment comprising immersing said bearing structure in a molten solder bath at a temperature ranging from about 650° F. to about 750° F., said bath comprising from about 4% to about 25% tin, from about 0% to about 4% antimony, and from about 71% to about 96% lead, maintaining said bearing structure immersed in said bath for a period of time sufficient to melt the lead phases in said bearing layer and permitting diffusion of said tin and antimony into said molten lead phases displacing portions thereof and becoming alloyed therewith to the extent that the tin and antimony comprise from about 2% to about 28% by weight of said sintered layer.

6. A process of manufacturing a composite bearing comprising treating a metallic bearing structure comprising a bearing layer bonded to a hard metal backing strip, said bearing layer being a dense and nonporous sintered layer comprising interspersed phases of copper and lead bonded to said backing strip, said treatment comprising immersing said bearing structure in a molten solder bath at a temperature ranging from about 650° F. to about 750° F., said bath comprising from about 4% to about 25% tin, from about 0% to about 4% antimony, and from about 71% to about 96% lead, maintaining said bearing structure immersed in said bath for a period of time sufficient to melt the lead phases in said bearing layer and permitting diffusion to said tin and antimony into said molten lead phases displacing portions thereof and becoming alloyed therewith to the extent that the tin and antimony comprise from about 2% to about 28% by weight of said sintered layer, and relatively vibrating said molten solder bath and said bearing structure at a frequency in the range of sonic and supersonic frequencies.

7. A process of manufacturing a composite bearing comprising treating a metallic bearing structure comprising a bearing layer bonded to a hard metal backing strip, said bearing layer being a dense and nonporous sintered layer comprising interspersed phases of copper and lead bonded to said backing strip, said treatment comprising immersing said bearing structure in a molten solder bath at a temperature ranging from about 650° F. to about 750° F., said bath comprising from about 4% to about 25% tin and the balance lead, maintaining said bearing structure immersed in said bath for a period of time sufficient to melt the lead phases in said bearing layer and permitting diffusion of said tin into said molten lead phases displacing portions thereof and becoming alloyed therewith to the extent that the tin comprises from about 2% to about 24% by weight of said sintered layer, and relatively vibrating said molten solder bath and said bearing structure at a frequency in the range of sonic and supersonic frequencies.

8. A process of manufacturing a composite bearing comprising treating a metallic bearing structure comprising a bearing layer bonded to a hard metal backing strip, said bearing layer being a dense and nonporous sintered layer comprising interspersed phases of copper and lead bonded to said backing strip, said treatment comprising immersing said bearing structure in a molten solder bath at a temperature ranging from about 650° F. to about 750° F., said bath comprising from about 4% to about 25% tin and the balance lead, maintaining said bearing structure immersed in said bath for a period of time sufficient to melt the lead phases in said bearing layer and permitting diffusion of said tin into said molten lead phases displacing portions thereof and becoming alloyed therewith and forming a tin-rich phase at the boundaries between the copper phases and lead-tin alloy phases, said alloyed lead phase ranging from about one part tin to from about 4 to about 24 parts lead, and relatively vibrating said bath and said bearing structure at a frequency in the range of sonic and supersonic frequencies.

References Cited in the file of this patent

UNITED STATES PATENTS

| | | |
|---|---|---|
| 2,190,237 | Koehing | Feb. 13, 1940 |
| 2,293,840 | Lignian | Aug. 25, 1942 |
| 2,585,430 | Boegehold | Feb. 12, 1952 |
| 2,635,020 | Beebe | Apr. 14, 1953 |

FOREIGN PATENTS

| | | |
|---|---|---|
| 137,999 | Australia | July 17, 1950 |

UNITED STATES PATENT OFFICE

CERTIFICATION OF CORRECTION

Patent No. 2,970,933                      February 7, 1961

Lawrence A. Barera et al.

It is hereby certified that error appears in the above numbered patent requiring correction and that the said Letters Patent should read as corrected below.

Column 2, line 35, for "lead-in" read -- lead-tin --; line 38, for "materal" read -- material --; column 6, line 70, for "nomical" read -- nominal --; column 7, line 24, for "continusuoly" read -- continuously --; column 8, line 49, for "diffusion to" read -- diffusion of --.

Signed and sealed this 18th day of July 1961.

(SEAL)
Attest:

ERNEST W. SWIDER                      DAVID L. LADD
Attesting Officer                      Commissioner of Patents